United States Patent
Boehme et al.

(10) Patent No.: US 9,776,288 B2
(45) Date of Patent: Oct. 3, 2017

(54) METHOD FOR MANUFACTURING AN ASSEMBLED CAMSHAFT

(71) Applicant: MAN Truck & Bus AG, Munich (DE)

(72) Inventors: Ulrich Boehme, Nuremberg (DE); Adrian Fink, Nuremberg (DE)

(73) Assignee: MAN TRUCK & BUS AG, Munich (DE)

( * ) Notice: Subject to any disclaimer, the term of this patent is extended or adjusted under 35 U.S.C. 154(b) by 215 days.

(21) Appl. No.: 14/322,352

(22) Filed: Jul. 2, 2014

(65) Prior Publication Data

US 2015/0026977 A1  Jan. 29, 2015

(30) Foreign Application Priority Data

Jul. 25, 2013  (DE) .................. 10 2013 012 384

(51) Int. Cl.
| | |
|---|---|
| *B23P 11/02* | (2006.01) |
| *B23B 31/40* | (2006.01) |
| *B24B 19/12* | (2006.01) |
| *F16D 1/08* | (2006.01) |
| *F16H 53/02* | (2006.01) |
| *B23P 15/00* | (2006.01) |
| *F16B 4/00* | (2006.01) |
| *F01L 1/047* | (2006.01) |

(52) U.S. Cl.
CPC .......... *B23P 11/025* (2013.01); *B23B 31/40* (2013.01); *B23P 11/022* (2013.01); *B23P 15/00* (2013.01); *B24B 19/12* (2013.01); *F16D 1/0858* (2013.01); *F16H 53/025* (2013.01); *B23B 2215/16* (2013.01); *B23P 2700/02* (2013.01); *F01L 2001/0471* (2013.01); *F16B 4/004* (2013.01); *Y10T 29/49293* (2015.01)

(58) Field of Classification Search
CPC ......... B23P 11/02; B23P 11/022; B24B 19/12
See application file for complete search history.

(56) References Cited

U.S. PATENT DOCUMENTS 4,660,269 A * 4/1987 Suzuki ................. B21D 26/045
29/421.1
4,781,076 A * 11/1988 Hartnett ............... B21D 53/845
29/432

(Continued)

FOREIGN PATENT DOCUMENTS

GB  2050207 A *  1/1981  ............. B21D 39/04

*Primary Examiner* — Jacob Cigna
(74) *Attorney, Agent, or Firm* — Lucas & Mercanti, LLP

(57) ABSTRACT

A method for manufacturing an assembled camshaft for valve-controlled internal combustion engines, in which at least one cam disc with a base circle region and cam region is machined on the running surface and has a cam-disc recess, includes shrinking the cam disc onto a corresponding shaft designed with a defined dimensional overlap by cooling the shaft and heating the cam disc. Temporally before being shrunk onto the shaft, the at least one cam disc is clamped by a clamping device such that a tension force acts on the recess wall region, which defines the cam-disc recess, the tension force corresponding to a predetermined extent to the state of stresses and/or deformation state of the recess wall region after the operation of shrinking the cam disc onto the corresponding shaft. The running-surface machining of the at least one cam disc takes place when the cam disc is clamped by the clamping device.

19 Claims, 2 Drawing Sheets

(56) References Cited

U.S. PATENT DOCUMENTS

| | | | | |
|---|---|---|---|---|
| 4,867,004 A * | 9/1989 | Swars | ............... | B21D 39/203 29/523 |
| 4,875,270 A * | 10/1989 | Krips | ............... | B21D 39/06 285/381.1 |
| 4,993,282 A * | 2/1991 | Swars | ............... | B21D 53/845 123/90.6 |
| 5,004,370 A * | 4/1991 | Swars | ............... | B21D 39/04 403/248 |
| 5,101,554 A * | 4/1992 | Breuer | ............... | B21D 39/04 29/421.1 |
| 5,337,476 A * | 8/1994 | Orsini, Jr. | ............... | B21C 1/24 29/523 |
| 5,428,894 A * | 7/1995 | Orsini, Jr. | ............... | B21D 39/06 29/523 |
| 5,435,207 A * | 7/1995 | Orsini, Jr. | ............... | B21D 39/06 123/90.27 |
| 7,913,373 B2 * | 3/2011 | Herrmann | ............... | B21D 39/06 29/506 |
| 7,992,533 B2 * | 8/2011 | Vogel | ............... | B24B 19/12 123/90.16 |
| 2006/0005385 A1 * | 1/2006 | Quaas | ............... | B23P 11/025 29/888.08 |
| 2007/0264913 A1 * | 11/2007 | Fritz | ............... | B24B 19/12 451/49 |
| 2008/0173128 A1 * | 7/2008 | Vogel | ............... | B24B 19/12 74/567 |
| 2008/0222889 A1 * | 9/2008 | Asbeck | ............... | B21D 53/845 29/888.1 |
| 2010/0224145 A1 * | 9/2010 | Mueller | ............... | F01L 1/047 123/90.1 |
| 2012/0131790 A1 * | 5/2012 | Schacherer | ............... | B23B 31/1179 29/557 |

* cited by examiner

METHOD FOR MANUFACTURING AN ASSEMBLED CAMSHAFT

CROSS-REFERENCE TO RELATED APPLICATIONS

This application claims the priority of DE 10 2013 012 384.4 filed Jul. 25, 2013, which is incorporated by reference herein.

BACKGROUND OF THE INVENTION

The present invention relates to a method for manufacturing an assembled camshaft, in particular for valve-controlled internal combustion engines, and to a device, in particular for machining the running surface of cam discs for assembled camshafts and/or for carrying out the method. Furthermore, the invention relates to the use of the method together with the device.

Assembled camshafts have the advantage, in particular for mass production, that they can be produced cost-effectively and, when thin-walled components are used, have a lower weight. The cam discs can be fixed on the corresponding shaft in a known manner by integral bonding (for example, by welding) or by shrinking thereon. When the cam discs are shrunk thereon, the running surfaces of said cam discs undergo microscopic deformations which may require remachining.

SUMMARY OF THE INVENTION

It is an object of the invention to provide a method and a device for machining the running surface of cam discs for assembled camshafts, by means of which method and device remachining of the running surfaces of the cam discs can be dispensed with and precise running-surface geometries can be set, without substantial additional cost.

According to an embodiment of the present invention, a method for manufacturing an assembled camshaft, in particular for valve-controlled internal combustion engines, is proposed, in which at least one cam disc with a base circle region and cam region is machined on the running surface by a running-surface-machining device, wherein the at least one cam disc has a cam-disc recess which is formed, for example, by a bore and by means of which the cam disc is shrunk onto a corresponding shaft designed with a defined dimensional overlap, for example, is shrunk thereon by cooling the shaft and heating the cam disc. According to the invention, it is proposed that, temporally before being shrunk onto the shaft, the at least one cam disc has been or is clamped by a clamping device in such a manner that a tension force acts on the recess wall region, which defines the cam-disc recess, of the cam disc, the tension force corresponding to a predetermined extent to the state of stresses and/or deformation state of the recess wall region after the operation of shrinking the cam disc onto the corresponding shaft. Then, likewise, in turn, temporally before the at least one cam disc is shrunk onto the shaft, a running-surface machining of the at least one cam disc takes place in the clamped state.

In other words, the cam disc is therefore, as it were, prestressed or deformed by the clamping according to the invention in a manner as is likewise the case, or is at least approximately the case, during the subsequent operation of shrinking the cam disc onto the shaft. If, in this state, the running surface of the cam disc is precisely finished, in particular ground, to the required surface quality and geometry, the running surface manufactured in this manner is also present after the cam disc has been shrunk on. Further remachining is therefore no longer required and can be dispensed with.

In principle, however, it could also be provided that the tension force does not exactly correspond to the tension force after the operation of shrinking onto the corresponding shaft, for example is slightly smaller or else slightly larger. This depends on the respective use situations specifically present.

According to a preferred specific manner of conducting the method, it is proposed that the clamping device has a tension tube onto which the at least one cam disc is pushed or threaded by the cam-disc recess thereof in a contact connection. The tension tube is expanded, in particular elastically expanded, at least in the region assigned to the cam-disc recess to the effect that, in the event of an expansion of the region, which is brought about by a corresponding application of force and is directed outwards in the direction of the cam disc, a defined tension force is exerted on the recess wall region, which bounds the cam-disc recess, of the cam disc. The application of force preferably takes place here, as will be explained in more detail by way of example below, hydraulically via a hydraulic device connected to the tension tube and/or mechanically via a tool mechanically expanding the tension tube.

The clamping device, in particular a tension tube, which is described in more detail below, of the clamping device, can rationally be heated in a specific manner during the clamping and widening thereof in such a manner that the preferably elastic deformability thereof is increased. Furthermore, a plurality of cam discs can also be clamped and finished simultaneously, in particular those cam discs which are shrunk onto a common, corresponding shaft are machined simultaneously on a clamping device.

Furthermore, the clamping device can be designed in such a manner that the latter, with respect to the circumference of the recess wall region, produces differently distributed tension forces or material stresses in the region of the cam-disc recess. It is therefore possible to set running-surface geometries during the finishing operation, the running-surface geometries being formed in a specific manner after the shrinking-on operation and, for example, excluding edge loads during the operational loading.

In a further advantageous method step, the cam disc can be held in a position oriented in a defined manner by means of aids, such as gauges, stops or the like, which can be temporarily applied to the clamping device, in order, for example, to counter angle errors.

A device according to the invention, in particular for machining the running surface of cam discs for assembled camshafts and/or for carrying out the method according to the invention, is characterized in that the device has a clamping device or is formed by a clamping device which, in turn, is designed in such a manner that at least one cam disc, which has a cam-disc recess and can be shrunk onto a corresponding shaft, can be clamped on the clamping device such that a tension force acts on the recess wall region, which defines the cam-disc recess, of the cam disc, the tension force corresponding approximately or to a predetermined extent to the state of stresses and/or deformation state of the recess wall region after the operation of shrinking the cam disc onto the corresponding shaft. The advantages already described in detail previously can therefore be achieved.

In a particularly preferred refinement, the clamping device has a tension tube onto which the at least one cam disc can be pushed by the cam-disc recess thereof, wherein the tension tube is designed to be expandable at least in the region assigned to the cam-disc recess in such a manner that, in the event of an expansion of said region, which is brought about by a corresponding application of force, for example by a hydraulic and/or mechanical application of force, and is directed outwards in the direction of the cam disc, a defined tension force can be exerted on a recess wall region, which defines the cam-disc recess, of the cam disc. The clamping operation can therefore be carried out in a functionally reliable and simple manner. The tension tube or the expansion region of the tension tube is preferably expanded elastically, i.e., after the application of force the expanded tension-tube region shifts back again into the starting position and is available for new uses.

In a particularly preferred hydraulic clamping device, the tension tube is designed to be closed on one side, wherein a pressure medium source generating a high isostatic pressure is connected to the other end side thereof. The tension tube can therefore be expanded here in the elastic deformation range by a medium in such a manner that the tension force or material stress that is comparable to the shrinking-operation is impressed on the cam disc.

As an alternative thereto, the clamping device can also be expandable mechanically. For this purpose, two male cones which can be acted upon in an opposed manner and interact with corresponding female cones of the tension tube can be particularly preferably provided. The tension tube can then be expanded in a specific manner by relative movement of the two male cones, wherein the required, high actuating forces are internal forces which advantageously can be applied, for example, hydraulically or can be supported in the machining station.

In a particularly simple activation means here, the male cones can be arranged on pull and/or push rods. In addition, the pull rod can be guided in an axially displaceable manner within the tension tube in the coaxial, tubular push rod. The male cones can therefore be actuated from the one end side of the tension tube.

Furthermore, the wall thickness of the tension tube can be designed with a different wall thickness in the axial direction and/or in the circumferential direction in order to generate differently distributed tension forces or material stresses.

The tension tube is preferably assigned to a running-surface machining device or station, formed, for example, by a grinding device, for the finishing of the running surface of the cam disc (or of a plurality of cam discs) or is installed on said cam disc or is part of same.

A particularly preferred use of the method and of a clamping device in this regard resides in the manufacturing of assembled camshafts for internal combustion engines of motor vehicles, in particular of commercial vehicles.

BRIEF DESCRIPTION OF THE DRAWINGS

Two exemplary embodiments of the invention are explained in more detail by way of example with reference to the attached, schematic drawing, in which.

DETAILED DESCRIPTION OF THE PREFERRED EMBODIMENTS

Figure 1:
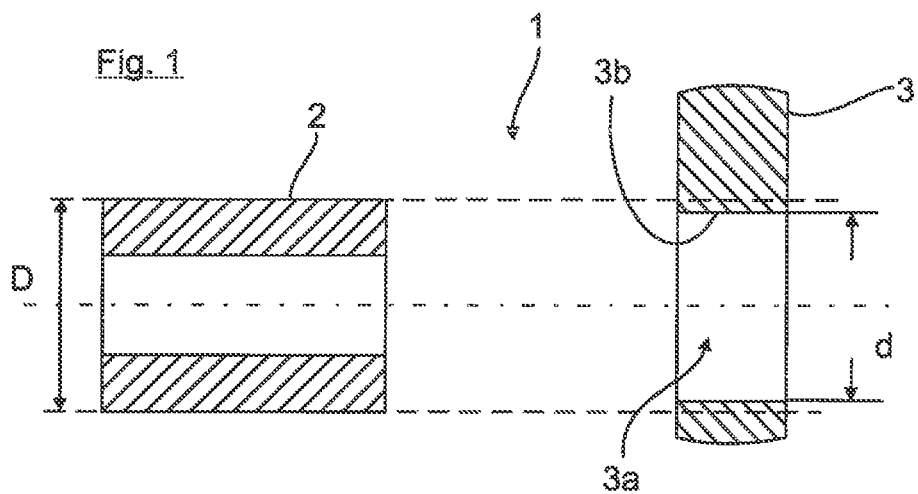
FIG. 1 is a cross-section diagram showing the individual parts of an assembled camshaft with a tubular shaft and a cam disc.
Figure 2:
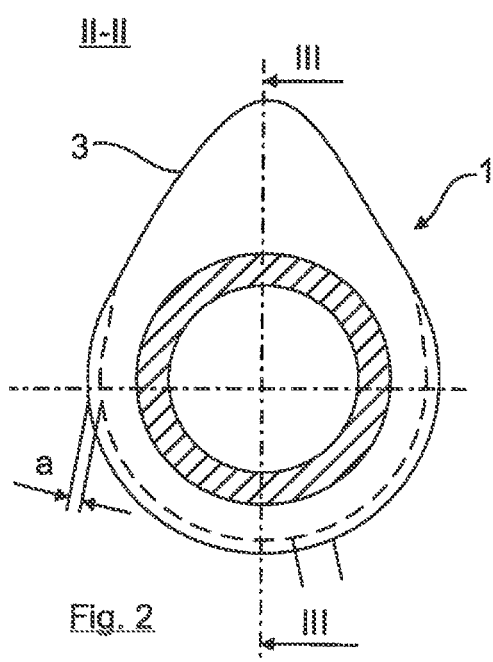
FIG. 2 shows the assembled camshaft with the cam disc, which is shrunk onto the shaft, in a cross section according to line II-II from FIG. 3.
Figure 3:
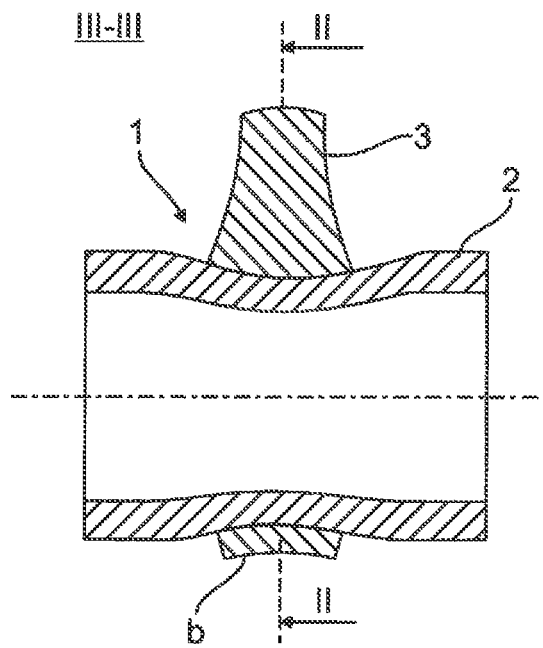
FIG. 3 shows the assembled camshaft in a longitudinal section along the line III-III from FIG. 2.

A shaft 2 and an individual cam disc 3 of an assembled camshaft 1 for internal combustion engines, in particular for motor vehicles or commercial vehicles, are illustrated in a roughly schematic manner and only in part in FIG. 1, wherein the cam disc 3, as is apparent in FIGS. 2 and 3, is shrunk onto the shaft 2.

For this purpose, the shaft 2, which is of tubular design here by way of example and is manufactured, for example, from steel or light metal, and with the outside diameter D thereof in a dimensional overlap with the inside diameter d of the cam disc 3 which, for example, is of the same material. The cam disc 3 has a cam-disc recess 3a which is bounded by a recess wall region 3b and is preferably formed by a bore. The shrinking-on operation takes place by appropriate temperature control of the cam disc 3 and shaft 2, for example by cooling the shaft 2 and simultaneously heating the cam disc 3, and by subsequently threading the cam disc 3 or a plurality of cam discs 3 onto the shaft. After the temperature of shaft 2 and cam disc 3 is equalized, a ready assembled camshaft 1 with a defined cam-running-surface geometry is present.

FIGS. 2 and 3 show in greatly exaggerated form the deformations which are possible during the shrinking-on operation by the material stresses which occur when the temperature of the components 2, 3 is equalized and which can occur in particular in the cam-base-circle region of the cam disc 3 (low wall thickness) and can lead, for example, to a lifting curve error a (FIG. 2, indicated by dashed lines) or to a concave running surface b, as viewed in cross section (FIG. 3), with the risk of edge loads.

This would result in the running surface of the cam disc 3, on which a valve-actuating element, such as a tilting lever, a tilting lever roller, a bucket tappet, etc., runs during the operation of the internal combustion engine, having to be remachined, in particular reground, in order preferably to ensure a slightly convex running surface and a precisely defined cam geometry.

Figure 4:
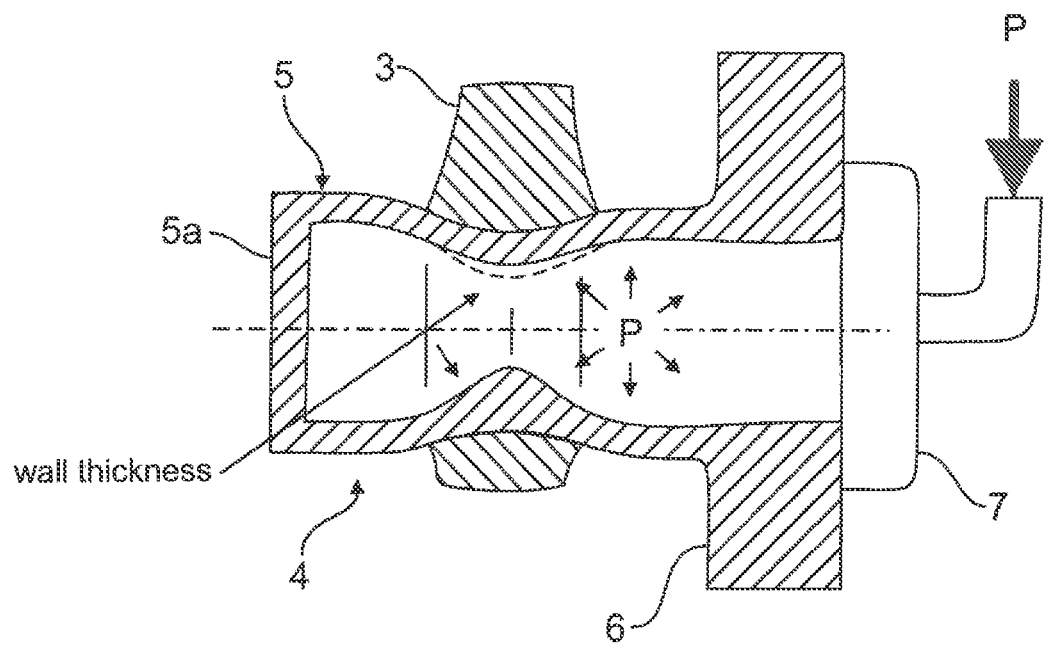
FIG. 4 is a cross-section of a clamping device with a hydraulically expandable tension tube for machining the running surface of the cam disc of the assembled camshaft.

In order to avoid the deformations, which are illustrated in exaggerated form in FIGS. 2 and 3, of the cam disc 3 or of the running surface thereof, during the manufacturing of the cam disc 3 use is made of a clamping device 4 which is illustrated by way of example in FIG. 4 and, for example, forms part or a functional part of a running-surface-machining device or station (not illustrated) in which the running surface of the cam disc 3 is finished, in particular ground. For example, the running-surface-machining device can preferably be formed by a grinding machine, in particular by a contour grinding machine.

The clamping device 4 has a tension tube 5 which is preferably of thin-walled and/or metallic design and has an integrally formed fastening flange 6 via which said tension tube can be connected to the running-surface-machining device.

The tension tube 5 is designed to be closed on one end side 5a thereof and to be open towards the fastening flange 6 and can be acted upon with hydraulic medium of high isostatic pressure (arrows P) through the fastening flange 6 via a pressure connection 7.

As shown in the exemplary embodiment, the tension tube 5 can have a different wall thickness and optionally can also be designed with a wall thickness which is different (non-circular) in the circumferential direction (indicated by dashed lines) in order to generate the desired deformations.

For the machining of the running surface of the cam disc 3, the latter is pushed onto the tension tube 5, which is formed cylindrically on the outer circumference, wherein aids, such as gauges or stops, can optionally be provided (not illustrated), by means of which the cam disc 3 is positioned in a specific manner on the tension tube 5.

The tension tube 5 is subsequently acted upon with high hydraulic pressure P through the fastening flange 6 and is accordingly expanded in the elastic deformation range, wherein the tension tube 5 is designed in such a manner that an outwardly directed material stress or microscopic deformation, as will also arise during the subsequent shrinking of the cam disc 3 onto the shaft 2, is exerted on the cam disc 3. By means of the hydraulic pressure, the tension tube 5 is therefore expanded, in particular expanded elastically, at least in the region assigned to the cam-disc recess 3a of the at least one cam disc 3 in such a manner that said tension tube exerts a defined tension force on the recess wall region 3b, which bounds the cam-disc recess 3a, of the cam disc 3, said tension force corresponding to a predetermined extent, preferably approximately precisely, to the state of stresses and/or deformation state of the recess wall region 3b after the operation of shrinking the cam disc 3 onto the corresponding shaft 2.

FIG. 4 shows, in greatly exaggerated form, the prestressing state of the tension tube 5 against the cam disc 3; of course, said prestressing state cannot be determined simply with the eye.

In said prestressing state, the cam disc 3 is fastened frictionally on the tension tube and the running surface of said cam disc can be finished or ground on the machining station, wherein the microdeformations occurring because of the subsequent shrinking of the cam disc 3 onto the shaft 2 have already been taken into consideration.

After the shrinking-on operation, the structurally desired running-surface geometry and quality is already present, and therefore no remachining is required.

As further shown in FIG. 4, holding aids 13 such as stops, are used to position the cam disc prior to clamping.

Figure 5:
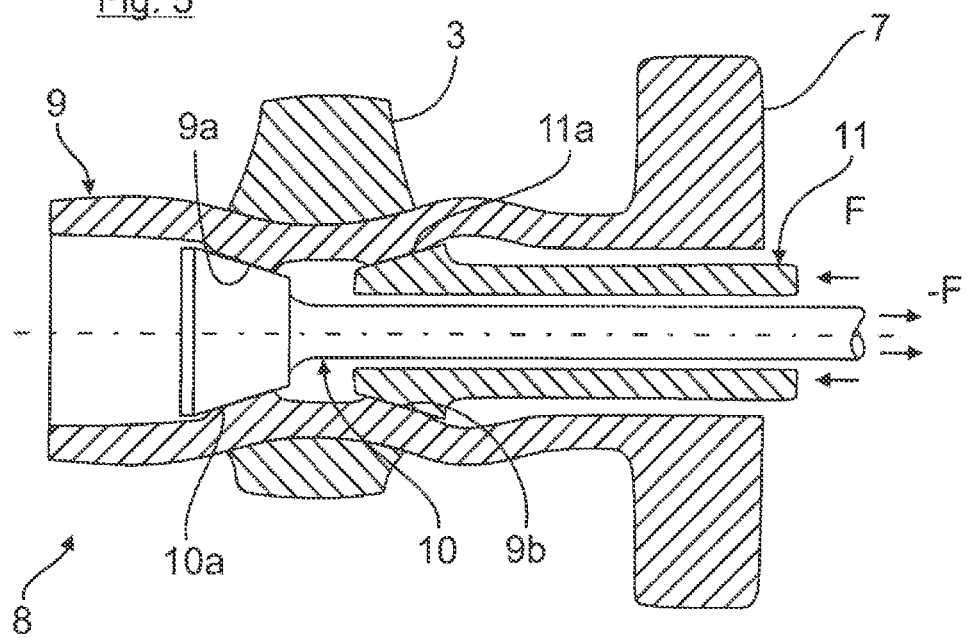
FIG. 5 is a cross-section of a further clamping device with a tension tube which is expandable mechanically via cones.

FIG. 5 shows an alternative clamping device 8 to FIG. 4, which is described only to the extent that it differs substantially from the clamping device 4. Functionally identical parts are provided with the same reference numbers.

According to FIG. 5, the tension tube 9 is expandable mechanically in the elastic deformation range, wherein, for this purpose, a pull rod 10 and a push rod 11 project through the fastening flange 6 into the tension tube 9.

The pull rod 10 bears a male cone 10a in the clamping region for the cam disc 3 and is guided in the coaxial push rod 11 which is of tubular design and, as is apparent, likewise bears a male cone 11a positioned opposite to said male cone 10a.

The male cones 10a, 11a interact with female cones 9a, 9b, which are formed in the tension tube 9, in such a manner that, by means of oppositely directed action of the male cones 10a, 11a via the pull rod 10 and the push rod 11 with a force F or −F, the tension tube 9 is expanded in a specific manner, as previously described.

The relatively high force F can be applied via the machining station hydraulically (piston-cylinder unit) or mechanically, for example via an eccentric unit, and forms an internal force. For example, the pull rod 10 can be connected to a hydraulic piston and the push rod 11 can be connected to the cylinder of the unit, or vice versa.

The machining sequence is as described with respect to FIG. 4 and likewise permits finishing of the cam disc 3 which accordingly does not require any remachining after the cam disc 3 has been shrunk onto the shaft 2.

The tension tube 5 or 9 can be designed in such a manner that a plurality of cam discs 3 can be machined simultaneously in the machining device. Furthermore, a heating device 14 can optionally be provided (shown schematically in FIG. 4), said heating device, by means of temporary heating of the tension tube 5 or 9, assisting the specific expansion thereof.

The assembled camshafts 1 can preferably be used for controlling the valves of internal combustion engines for motor vehicles, in particular commercial vehicles; however other camshafts can also be correspondingly designed, for example for fuel injection pumps, etc.

LIST OF REFERENCE NUMBERS

1 Camshaft
2 Shaft
3 Cam disc
3a Cam-disc recess
3b Recess wall region
4 Clamping device
5 Tension tube
5a End side
6 Fastening flange
7 Pressure connection
8 Clamping device
9 Tension tube
9a Female cone
9b Female cone
10 Push rod
10a Male cone
11 Pull rod
11a Male cone
13 Holding aid
14 Heating device

The invention claimed is:

1. A method for manufacturing an assembled camshaft for valve-controlled internal combustion engines, the assembled camshaft including a shaft and at least one cam disc with a base circle region and a cam region, the method comprising:
shrinking the at least one cam disc onto the shaft by a cam-disc recess designed with a defined dimensional overlap with the shaft;
temporally before said step of shrinking, clamping the at least one cam disc by a clamping device so that a tension force acts on a recess wall region of the cam disc recess, the tension force corresponding to one of a state of stresses and a deformation state of the recess wall region after the at least one cam disc is shrunk onto the shaft; and
machining the at least one cam disc by a running-surface-machining device when the at least one cam disc is clamped by the clamping device,
wherein the step of clamping includes pushing the at least one cam disc by the cam-disc recess onto a tension tube region of a tension tube of the clamping device, and expanding the tension tube at least in the tension tube region with the cam-disc recess by a corresponding application of force such that the tension tube region is directed outward in the direction of the cam disc and the tension force is exerted on the recess wall region of the cam disc, and the step of expanding comprising acting, by a pressure medium source, on the tension tube by a pressure of a defined magnitude with a pressure medium to expand the tension tube in an elastic deformation range of the tension tube; and providing the tension tube of the clamping device with a varying wall thickness in at least one of an axial direction and a circumferential direction of the tension tube so that different tension forces distributed over a circumference of the recess wall region are generated during the step of expanding.

2. The method according to claim 1, wherein the step of shrinking includes cooling the shaft and heating the cam disc.

3. The method according to claim 1, wherein the step of clamping further comprises heating the clamping device.

4. The method according to claim 1, wherein the at least one cam disc is held in a position by aids temporarily applied to the clamping device temporally before the at least one cam disc is clamped.

5. The method according to claim 1, wherein, during the steps of clamping and machining, the at least one cam disc with the cam-disc recess is clampable on the clamping device so that a tension force acts on the recess wall region of the cam disc recess, the tension force acting on the recess wall region corresponding to a predetermined extent to at least one of a state of stresses and a deformation state of the recess wall region when the at least one cam disc is shrunk onto the corresponding shaft.

6. The method according to claim 1, wherein the step of providing includes providing the tension tube of the clamping device with a varying wall thickness in the circumferential direction of the tension tube.

7. The method according to claim 1, wherein the step of providing includes providing the tension tube of the clamping device with a varying wall thickness in the axial direction of the tension tube.

8. The method according to claim 1, wherein the tension tube has a first closed end and a second end connected to the pressure medium source.

9. The method according to claim 8, wherein the pressure medium is a hydraulic pressure medium.

10. The method according to claim 1, wherein said step of clamping comprises clamping a plurality of cam discs on the clamping device and the step of machining comprises machining the plurality of cam discs simultaneously on the clamping device.

11. The method according to claim 10, wherein the plurality of cam discs are cam discs that are to be shrunk onto a common shaft to produce the assembled camshaft.

12. A method for manufacturing an assembled camshaft for valve-controlled internal combustion engines, the assembled camshaft including a shaft and at least one cam disc with a base circle region and a cam region, the method comprising:

shrinking the at least one cam disc onto the shaft by a cam-disc recess designed with a defined dimensional overlap with the shaft;

temporally before said step of shrinking, clamping the at least one cam disc by a clamping device so that a tension force acts on a recess wall region of the cam disc recess, the tension force corresponding to one of a state of stresses and a deformation state of the recess wall region after the at least one cam disc is shrunk onto the shaft; and machining the at least one cam disc by a running-surface-machining device when the at least one cam disc is clamped by the clamping device, wherein the step of clamping includes pushing the at least one cam disc by the cam-disc recess onto a tension tube region of a tension tube of the clamping device, and expanding the tension tube at least in the tension tube region with the cam-disc recess by a corresponding application of force such that the tension tube region is directed outward in the direction of the cam disc and the tension force is exerted on the recess wall region of the cam disc, and the step of expanding comprising acting on two male cones in opposite directions by a pull rod and a push rod to interact, respectively, with female cones of the tension tube, said step of expanding comprises oppositely directed actuation of the pull rod and the push rod so that the tension tube is expanded with the tension force.

13. The method according to claim 12, wherein the step of shrinking includes cooling the shaft and heating the cam disc.

14. The method according to claim 12, wherein the step of clamping further comprises heating the clamping device.

15. The method according to claim 12, wherein the at least one cam disc is held in a position by aids temporarily applied to the clamping device temporally before the at least one cam disc is clamped.

16. The method according to claim 12, wherein, during the steps of clamping and machining, the at least one cam disc with the cam-disc recess is clampable on the clamping device so that a tension force acts on the recess wall region of the cam disc recess, the tension force acting on the recess wall region corresponding to a predetermined extent to at least one of a state of stresses and a deformation state of the recess wall region when the at least one cam disc is shrunk onto the corresponding shaft.

17. The method according to claim 12, further comprising the step of providing the tension tube of the clamping device with a different wall thickness in at least one of an axial direction and a circumferential direction of the tension tube so that different tension forces distributed over a circumference of the recess wall region are generated during the step of expanding.

18. The method according to claim 12, wherein said step of clamping comprises clamping a plurality of cam discs on the clamping device and the step of machining comprises machining the plurality of cam discs simultaneously on the clamping device.

19. The method according to claim 18, wherein the plurality of cam discs are cam discs that are to be shrunk onto a common shaft to produce the assembled camshaft.

* * * * *